United States Patent
Kluttz et al.

[11] Patent Number: 6,133,350
[45] Date of Patent: Oct. 17, 2000

[54] OIL FREE COMPOUNDS OF STYRENIC BLOCK COPOLYMERS, AMORPHOUS POLYOLEFINS, AND CARBON BLACK

[75] Inventors: Robert Quillin Kluttz, Houston; Harriet Jeanne Spinn Kendrick, Cypress, both of Tex.

[73] Assignee: Shell Oil Company, Houston, Tex.

[21] Appl. No.: 08/904,528

[22] Filed: Aug. 1, 1997

Related U.S. Application Data

[60] Provisional application No. 60/023,875, Aug. 13, 1996.

[51] Int. Cl.$^7$ ..................................................... C08L 5/07
[52] U.S. Cl. ........................... 524/59; 524/505; 524/534
[58] Field of Search ................................ 524/505, 534, 524/59

[56] References Cited

U.S. PATENT DOCUMENTS

| | | | |
|---|---|---|---|
| H1250 | 11/1993 | Gilmore et al. | 524/68 |
| 4,282,127 | 8/1981 | Desgouilles | 260/28.5 AS |
| 4,368,228 | 1/1983 | Gorgati | 428/110 |
| 4,420,524 | 12/1983 | Gorgati | 428/110 |
| 4,891,272 | 1/1990 | Ciaccia | 428/489 |
| 4,973,615 | 11/1990 | Futamura et al. | 524/66 |
| 5,036,119 | 7/1991 | Berggren | 523/351 |
| 5,328,943 | 7/1994 | Isobe et al. | 524/70 |
| 5,451,621 | 9/1995 | Usmani et al. | 524/68 |

FOREIGN PATENT DOCUMENTS

| | | | |
|---|---|---|---|
| 0345402 A1 | 12/1989 | European Pat. Off. | C08L 95/00 |
| 632170-A2 | 8/1995 | European Pat. Off. | E04D 5/10 |
| 3417047 A1 | 11/1985 | Germany | C08L 95/00 |
| 61-236511 | 10/1986 | Japan | G02B 6/44 |
| 01290860 | 11/1989 | Japan | E04D 5/14 |
| WO 9102776 | 7/1991 | WIPO | C08L 95/00 |

*Primary Examiner*—Peter D. Mulcahy
*Attorney, Agent, or Firm*—Donald F. Haas

[57] ABSTRACT

An oil-free compound which comprises from 20 to 90% by weight of a block copolymer of a vinyl aromatic hydrocarbon and a conjugated diene optionally hydrogenated, from 10 to 70% by weight of a low viscosity amorphous polyolefin, and from 0.1 to 20% by weight of carbon black. A stable oil-free bituminous composition which comprises from 80 to 98% by weight of a bituminous component, from 2 to 20% by weight of the above compound. A membrane suitable for single ply roofing prepared from the above compound.

10 Claims, No Drawings

OIL FREE COMPOUNDS OF STYRENIC BLOCK COPOLYMERS, AMORPHOUS POLYOLEFINS, AND CARBON BLACK

CROSSREFERENCE TO RELATED APPLICATIONS

This application claims the benefit of U.S. Provisional Application No. 60/023,875, filed Aug. 13, 1996.

FIELD OF THE INVENTION

This invention relates to oil free block copolymer compounds which contain an amorphous polyolefin and carbon black as well as a block copolymer of a vinyl aromatic hydrocarbon and a conjugated diene which may optionally be hydrogenated. This invention also relates to a highly stable bituminous composition which contains bitumen and the aforementioned composition.

BACKGROUND OF THE INVENTION

Asphalt is a common material utilized for the preparation of paving and roofing materials and also for coatings such as pipe coatings and tank liners. While the material is suitable in many respects, it inherently is deficient in some physical properties which it would be highly desirable to improve. Efforts have been made in this direction by addition of certain conjugated diene rubbers, ethylene containing plastics like EVA, and polyethylene, neoprene, amorphous polyolefins, resins, fillers and other materials for the modification of one or more of the physical properties of the asphalt. Each of these added materials modifies the asphalt in one respect or another but certain deficiencies can be noted in all modifiers proposed. For example, some of them have excellent weather resistance, sealing and bonding properties but are often deficient with respect to warm tack, modulus, hardness and other physical properties; and some of them improve only the high temperature performance of asphalt, some only improve the low temperature performance of asphalt, while some lack thermal stability or mixing stability with asphalt.

Since the late 1960s, diene polymer rubbers such as styrene-butadiene rubber and styrene-rubber block copolymers such as styrene-butadiene-styrene and styrene-isoprene-styrene block copolymers have been used to dramatically improve the thermal and mechanical properties of asphalts. Practical application of the rubber addition approach requires that the blended product retain improved properties and homogeneity during transportation, storage and processing. Long term performance of elastomer-modified asphalts also depends on the ability of the blend to maintain thermal and chemical stability.

Such polymers have been found to be very advantageous but in some end uses, such as roll roofing membranes, high processing viscosity of blends of asphalt and such polymers leads to reduced manufacturing rates. Other attempts at lowering the processing viscosity, such as reducing molecular weight or polymer content or adding oil, have proved to be undesirable because the softening point of the composition was lowered to such an extent that adequate slump resistance could not be achieved. Also, the processing stability of blends of some of the commercially used polymers could advantageously be improved to provide a wider processing window. Hydrogenated versions of styrenic block copolymers provide greatly improved processing stability.

Styrenic block copolymers are widely used as asphalt modifiers for roofing and paving applications. Since asphalt can vary significantly in its chemical composition and molecular weight distribution, asphalt modifiers must either be supplied for specific asphalts or a modifier must be found that has utility over as wide a range of asphalt properties as possible. In particular, styrenic block copolymers tend to be incompatible with asphalts which have a high asphaltenes content. One compound which is compatible with such asphalts is a compounded blend of a styrenic block copolymer which is optionally hydrogenated, a naphthenic oil, and carbon black.

Mixtures of three components which have not been compounded by melt processing do not provide improved compatibility. Such compounds are disclosed in U.S. Pat. No. 5,036,119 the disclosures of which are herein incorporated by reference. The naphthenic oil is required because of the high melt viscosity of styrenic block copolymers, especially in the presence of carbon black. Typically compounds of high molecular weight styrenic block copolymers require the addition of oil to avoid unacceptable degradation or melt fracture during processing. A high level of oil is undesirable in applications which are highly sensitive to bleeding of the oil or where the oil causes unacceptable loss of high temperature properties.

Other polymers are currently used for asphalt modification including amorphous polyolefins, especially high molecular weight atactic polypropylene. Atactic polypropylene has advantages in processability and high temperature performance but requires higher addition levels than styrenic block copolymers. Lower molecular weight amorphous polyolefins do not have the strength or elasticity of styrenic block copolymers. It would be advantageous to produce a composition which combined the advantages of styrenic block copolymers and amorphous polyolefins and minimized their individual disadvantages. It has not been possible to create such compositions using conventional unhydrogenated styrenic block copolymers because they are incompatible with amorphous polyolefins. Blends of unhydrogenated styrenic block copolymers, amorphous polyolefins, and asphalt typically exhibit unacceptably poor phase stability during processing and long term performance.

Single ply membranes are widely used in the roofing industry. They are commonly produced from EPDM, PVC, and CSPE. EPDM makes thermoset single ply membranes which require careful cleaning and adhesive application to seal the seams. PVC and CSPE make thermoplastic single ply membranes which have environmental problems because the polymers are chlorinated.

Thus it can be seen that there is a need for a styrenic block copolymer compound that is easily processable, highly compatible with asphalt, and oil free to minimize bleeding and maximize high temperature properties. There is also a need for a method to compatibilize blends of unhydrogenated styrenic block copolymers and amorphous polyolefins. There is also a need for a method to compound high molecular weight styrenic block compounds, especially in the presence of carbon black, without the addition of oil. There is also a need for a thermoplastic, weatherable single ply roofing membrane which has minimal environmental problems. There is also a need for such a compound with enhanced weatherability. The present invention provides compounds which meet all these needs.

SUMMARY OF THE INVENTION

The present invention provides an oil-free compound which comprises from 20 to 90% by weight of a block copolymer of a vinyl aromatic hydrocarbon and a conjugated diene which is optionally hydrogenated, from 10 to 70% by weight of a low viscosity amorphous polyolefin, and from 0.1 to 20% by weight of carbon black. Additionally, the invention provides a stable oil-free bituminous composition which comprises from 80 to 98% by weight of a bituminous component and from 2 to 20% by weight of the above compound. Also, the invention provides a single ply roofing membrane made from the above compound.

DETAILED DESCRIPTION OF THE INVENTION

Compatible asphalts are preferred for use in the present invention. However, the present invention significantly widens the scope of asphalts which are compatible with the invention styrenic block copolymer compound. Asphalts with high asphaltene contents, i.e. greater than 12%, because such asphalts are generally incompatible with the polymer component. Asphaltenes are known to those skilled in the art. For purposes of this application, asphaltenes make up the n-heptane insoluble fraction of asphalt. The compounds of the present invention can be used with these asphalts to produce compatible and useful bitumen compositions.

The bituminous component in the bituminous-polymer compositions according to the present invention may be a naturally occurring bitumen or derived from a mineral oil. Also, petroleum derivatives obtained by a cracking process, pitch and coal tar can be used as the bituminous component as well as blends of various bituminous materials.

Examples of suitable components include distillation or "straight-run bitumens," precipitation bitumens, e.g. propane bitumens, blown bitumens and mixtures thereof. Other suitable bituminous components include mixtures of one or more of these bitumens with extenders such as petroleum extracts, e.g. aromatic extracts, distillates or residues, or with oils.

Polymers containing ethylenic unsaturation or both aromatic and ethylenic unsaturation may be prepared using anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like, but it also may be recovered as a liquid such as in the present invention. Polymers containing ethylenic unsaturation and polymers containing both aromatic and ethylenic unsaturation are available commercially from several suppliers.

In general, when solution anionic techniques are used, copolymers of conjugated diolefins and alkenyl aromatic hydrocarbons are prepared by contacting the monomer or monomers to be polymerized simultaneously or sequentially with an anionic polymerization initiator such as group IA metals, their alkyls, amides, silanolates, napthalides, biphenyls or anthracenyl derivatives. It is preferred to use an organoalkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organolithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenyl-butadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Alkenyl aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

The block copolymers may be produced by any well known block polymerization or copolymerization procedures including the well-known sequential addition of monomer techniques, incremental addition of monomer technique or coupling technique. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates.

The present invention also utilizes hydrogenated polymers. Hydrogenated polymers are useful in circumstances wherein unhydrogenated diene polymers have as one of their principal limitations their sensitivity to oxidation. This can be minimized by hydrogenating the copolymers, especially in the diene blocks. The hydrogenation of these polymers and copolymers may be carried out by a variety of well established processes including hydrogenation in the presence of such catalysts as Raney Nickel, noble metals such as platinum, palladium and the like and soluble transition metal catalysts. Titanium biscyclopentadienyl catalysts may also be used. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986, 4,226,952 and Reissue 27,145, the disclosures of which are herein incorporated by reference. The polymers are hydrogenated in such a manner as to produce hydrogenated polymers having a residual unsaturation content in the polydiene block of less than about 20%, and preferably as close to zero percent as possible, of their original unsaturation content prior to hydrogenation.

These polymers may have a vinyl aromatic hydrocarbon content of 20 to 35% by weight so that they achieve adequate properties and are sufficiently compatible with the asphalt. They should have a molecular weight of from 80,000 to 300,000. Polymers with molecular weight below 80,000 will be less efficient and polymers with molecular weight above 300,000 will be difficult to process.

The molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/number average molecular weight ratio approaches unity), and it is both convenient and adequately descriptive to report the "peak" molecular weight of the narrow molecular weight distribution observed. Usually, the peak value is between the number and the weight average. The peak molecular weight is the molecular weight of the main species shown on the chromatograph. For polydisperse polymers the weight average molecular weight should be calculated from the chromatograph and used. For materials to be used in the columns of the GPC, styrene-divinyl benzene gels or silica gels are commonly used and are excellent materials. Tetrahydrofuran is an excellent solvent for polymers of the type described herein. A refractive index detector may be used.

Measurement of the true molecular weight of the final coupled radial or star polymer is not as straightforward or as easy to make using GPC. This is because the radial or star shaped molecules do not separate and elute through the packed GPC columns in the same manner as do the linear polymers used for the calibration, and, hence, the time of arrival at a UV or refractive index detector is not a good indicator of the molecular weight. A good method to use for a radial or star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wavelength and in the same solvent used for the light scattering. The following references are herein incorporated by reference:
1. Modern Size-Exclusion Liquid Chromatography, W. W. Yau, J. J. Kirkland, D. D. Bly, John Wiley & Sons, New York, N.Y., 1979.
2. Light Scattering from Polymer Solution, M. B. Huglin, ed., Academic Press, New York, N.Y., 1972.
3. W. Kaye and A. J. Havlik, Applied Optics, 12, 541 (1973).
4. M. L. McConnell, American Laboratory, 63, May, 1978.

The low viscosity amorphous polyolefin of this invention should be of sufficiently high viscosity to limit migration and bleeding and sufficiently low viscosity for facile processing. The viscosity of the amorphous polyolefin as measured on a Brookfield viscometer should be less than 100,000 cps at 190° C. and greater than 100,000 cps at 38° C. The polyolefin should be amorphous as crystalline polyolefins will not form phase stable blends. For the purpose of this invention amorphous is defined as having a crystallinity of less than 10% as determined by small angle x-ray diffraction. Suitable polymers for this invention include polyethylene-propylene, atactic polypropylene, polyethylene-1-butene, a random copolymer of ethylene and a higher alpha olefin, and polyisobutylene.

The oil-free compound of this invention comprises from 20 to 90%, preferably 45 to 80%, by weight of a block copolymer of a vinyl aromatic hydrocarbon and a conjugated diene which is optionally hydrogenated, from 10 to 70%, preferably 10 to 40%, by weight of a low viscosity amorphous polyolefin, and from 0.1 to 20%, preferably 5 to 20%, by weight of carbon black. The styrenic block copolymer must comprise at least 20% of the compound and no more than 70% of the amorphous polyolefin or little benefit in properties over the amorphous polyolefin is realized. There must be at least 10% of the amorphous polyolefin and not more than 90% of the styrenic block copolymer or the compound cannot be easily processed by conventional melt processing techniques. The carbon black must be present in an amount of at least 0.1% or little benefit for stabilization and compatibilization is realized. If more than 20% is used, then little additional benefit is seen and melt processing becomes unduly difficult. Diene optionally hydrogenated, from 10 to 70% by weight of a low viscosity amorphous polyolefin, and from 0.1 to 20% by weight of carbon black. If less than 20% of the bituminous component is used, then the bituminous composition is unduly difficult to produce by conventional techniques and if more than 98% is used, then little benefit is derived from the addition of the compound.

Free carbon black is very difficult to handle. Its fine particle size, polarity, and electrical conductivity make it a severe nuisance dust. To overcome this problem, the carbon black may be preblended with part or all of the amorphous polyolefin to form a masterbatch prior to compounding with the styrenic block copolymer. This preblending may be accomplished at a temperature where the amorphous polyolefin is in a liquid state in blending equipment such as a ribbon blender, a drum mixer, or other conventional equipment.

This bituminous composition is useful for the manufacture of roll roofing membranes, waterproofing and dampproofing membranes, and elastomer modified shingles. This bituminous composition is also useful for the manufacture of hot mix asphalt concrete. This bituminous composition is also useful for hot mopping application of roll roofing membranes and built up roofing plies provided that the incorporated styrenic block copolymer is hydrogenated.

The invention also provides a single ply roofing membrane made from the above compound provided that the incorporated styrenic block copolymer is hydrogenated. This roofing membrane is weatherable and seams can be sealed by heat welding. It contains no halogen which is environmentally desirable. Optionally the membrane may include other components commonly used in single ply roofing membranes such as asphalt, isotactic polyolefins, fillers, UV stabilizers, and antioxidants. This single ply roofing membrane may be prepared using conventional sheet rubber manufacturing techniques such as calendering, molding, and sheet extrusion.

EXAMPLES

Compounds were prepared on a Banbury mixer. Vulcan 9A32 carbon black from Cabot was premixed with E1200 amorphous polyolefin from Eastman. Two compounds were prepared: Compound 1 with Polymer 1, a hydrogenated styrene-butadiene-styrene linear block copolymer having a weight average molecular weight of 126,000 and a polystyrene content of 30 percent by weight, and Compound 2 with Polymer 2, an unhydrogenated styrene-butadiene-styrene radial block copolymer having a weight average molecular weight of 264,000 and a polystyrene content of 31 percent by weight. The compounds contained 50% by weight of the block copolymer, 35% by weight of the amorphous polyolefin, and 15% by weight of the carbon black. These blends were processed in the Banbury mixer until a temperature of 190° C. was achieved (approximately three minutes).

These compounds were then used to make blends in asphalt. 600 grams of asphalt was preheated to 180° C. in a quart can. The desired amount of compound was cut into three to five millimeter pieces and added to the hot asphalt. The blend was stirred using a Silverson L4R high shear mill rotating at 3000 revolutions per minute for 45 minutes.

Blend 1—12% by weight of Compound 1 in AC20 asphalt made at Shell's Wood River, Illinois refinery.

Blend 2—12% by weight of Compound 2 in the same asphalt.

Blend 3—4% by weight of Compound 2 in Total AC20

Blend 4—The same as Blend 1 except the individual compound components, 6% by weight Polymer 1, 4.2% by weight of E1200, and 1.8% by weight of Vulcan 9A32 carbon black, were added directly to the asphalt without precompounding.

Blend 5—The same as Blend 2 except the individual compound components, 6% by weight Polymer 2, 4.2% by weight of E1200, and 1.8% by weight of Vulcan 9A32 carbon black, were added directly to the asphalt without precompounding.

Blend 6—16% by weight of Compound 1 in a Venezuelan AC10 asphalt.

Blends 1, 2, 4, and 5 were subjected to the one day can test for separation. A sample of the bituminous composition in a pint can is heated at 177° C. for one day. After cooling and removing the can, the hard, brittle asphaltene rich phase is5 separated from the soft, rubbery polymer rich phase with a hot knife. The fraction of polymer rich phase (FPR) is determined by dividing the weight of the polymer rich phase by the weights of both fractions. If there is no separation the FPR is 100%. A FPR less than 65% is poor. A standard unhydrogenated styrene-butadiene-styrene block copolymer blended in this same asphalt would have over 40% by weight separation. Blend 1 had a FPR of >95% and Blend 2 had a FPR of 100%. Blends 4 and 5 had FPR's of 50%.

Blend 3 was subjected to the aluminum tube separation test. A sample of the bituminous composition is sealed in an aluminum tube which is held vertically in an oven at 163° C. for two days. The sample is cooled and cut into thirds. The ring and ball softening point of the top and bottom thirds is determined. A difference in softening points of 2.5° C. is considered good. The standard unhydrogenated polymer above in Total AC20 would have a ring and ball difference of more than 12° C. Blend 3 had a difference of only 0.5° C. The upper PG grade as determined by AASHTO MP1 of Blend 3 was 70 versus 64 for the base asphalt.

Properties were determined for Blend 6. The Brookfield viscosity at 190° C. was 3800 cps. The ring and ball softening point was 134° C. The 25° C. penetration was 39 units. The penetration (pen) is a measure of hardness of asphalts and asphalt blends and is measured by ASTM D5 at 25° C. This bituminous composition would be suitable for formulating a roll roofing membrane or a mopping asphalt.

Three more compounds were produced comprising 50 percent by weight Polymer 1, 35 percent by weight of an amorphous polyolefin (APO), and 15 percent by weight of a different carbon black. The APOs used were three different grades from Eastman, EASTOFLEX E1200, P1023, and D172. The compounds were blended into Woodriver AC10 asphalt at 10.5 percent by weight. The properties are shown in the following table:

| APO | Softening Point ° C. | Pen | Viscosity of Neat APO @ 190° C. mPa-s |
|---|---|---|---|
| E1200 | 84 | 35 | 20,000 |
| P1023 | 82 | 34 | 2300 |
| D172 | 78 | 35 | 5800 |

The results shown in the above table indicate that utilizing amorphous polyolefins with a range of viscosities gives little effect on penetration and only a modest effect on the ring and ball softening point. Further, very little, if any, effect on the low temperature flexibility was observed.

We claim:

1. A stable bituminous composition, consisting essentially of:
   from 80 to 98% by weight of a bituminous component; and
   from 2 to 20% by weight of an oil-free compound consisting essentially of:
      from 20 to 90% by weight of a block copolymer of a vinyl aromatic hydrocarbon and a conjugated diene;
      from 10 to 70% by weight of a low viscosity amorphous polyolefin; and
      from 0.1 to 20% by weight of an oil-free carbon black.

2. The stable bituminous composition of claim 1, wherein the oil-free compound consists essentially of from 45 to 80% by weight of the block copolymer of a vinyl aromatic hydrocarbon and a conjugated diene, from 15 to 40% by weight of the low viscosity amorphous polyolefin, and from 5 to 20% by weight of the oil-free carbon black.

3. A stable bituminous composition, consisting essentially of:
   from 80 to 98% by weight of a bituminous component; and
   from 2 to 20% by weight of an oil-free compound consisting essentially of:
      from 20 to 90% by weight of a block copolymer of a vinyl aromatic hydrocarbon and a hydrogenated conjugated diene;
      from 10 to 70% by weight of a low viscosity amorphous polyolefin; and
      from 0.1 to 20% by weight of an oil-free carbon black.

4. The stable bituminous composition of claim 3, wherein the oil-free compound consists essentially of from 45 to 80% by weight of the block copolymer of a vinyl aromatic hydrocarbon and a hydrogenated conjugated diene, from 15 to 40% by weight of the low viscosity amorphous polyolefin, and from 5 to 20% by weight of oil-free carbon black.

5. The stable bituminous composition of claim 3, wherein the hydrogenated block copolymer has a residual unsaturation of less than about 20%.

6. A stable bituminous composition, produced by a process comprising:
   melt-blending an oil-free compound comprising:
      from 20 to 90% by weight of a block copolymer of a vinyl aromatic hydrocarbon and a hydrogenated conjugated diene;
      from 10 to 70% by weight of a low viscosity amorphous polyolefin; and
      from 0.1 to 20% by weight of an oil-free carbon black; and
   melt blending from 80 to 98% by weight of a bituminous component and from 2 to 20% by weight of the oil-free compound.

7. The stable bituminous composition of claim 6, wherein the oil-free compound consists essentially of from 45 to 80% by weight of the block copolymer of a vinyl aromatic hydrocarbon and a conjugated diene, from 15 to 40% by weight of the low viscosity amorphous polyolefin, and from 5 to 20% by weight of the oil-free carbon black.

8. The stable bituminous composition of claim 6, further comprising hydrogenating the block copolymer.

9. The stable bituminous composition of claim 6, wherein the oil-free carbon black is blended with at least a portion of the low viscosity amorphous polyolefin prior to blending with the block copolymer.

10. The stable bituminous composition of claim 9, wherein the composition comprises 15% by weight of the oil-free carbon black, 35% by weight of the amorphous polyolefin, and 50% by weight of the block copolymer.

* * * * *